US008856930B2

(12) United States Patent
Hirvonen

(10) Patent No.: US 8,856,930 B2
(45) Date of Patent: Oct. 7, 2014

(54) DOWNLOAD CONTROL

(75) Inventor: Timo Hirvonen, Espoo (FI)

(73) Assignee: F-Secure Corporation, Helsinki (FI)

(*) Notice: Subject to any disclaimer, the term of this patent is extended or adjusted under 35 U.S.C. 154(b) by 96 days.

(21) Appl. No.: 13/435,101

(22) Filed: Mar. 30, 2012

(65) Prior Publication Data
US 2013/0262851 A1 Oct. 3, 2013

(51) Int. Cl.
G06F 21/00 (2013.01)

(52) U.S. Cl.
USPC ............... 726/24; 726/12; 726/30; 713/168; 709/204

(58) Field of Classification Search
USPC .................................................... 726/22, 24
See application file for complete search history.

(56) References Cited

U.S. PATENT DOCUMENTS

| | | | | |
|---|---|---|---|---|
| 7,219,140 B2* | 5/2007 | Marl et al. | | 709/219 |
| 8,209,758 B1* | 6/2012 | Doukhvalov et al. | | 726/24 |
| 8,448,232 B1* | 5/2013 | Zhu et al. | | 726/12 |
| 8,528,087 B2* | 9/2013 | Hsu et al. | | 726/23 |
| 2006/0253578 A1 | 11/2006 | Dixon et al. | | 709/225 |
| 2009/0300761 A1* | 12/2009 | Park et al. | | 726/23 |
| 2009/0328209 A1* | 12/2009 | Nachenberg | | 726/22 |
| 2010/0008509 A1* | 1/2010 | Matsushita et al. | | 380/279 |
| 2011/0161668 A1* | 6/2011 | Sentinelli et al. | | 713/168 |
| 2011/0162070 A1 | 6/2011 | Krasser et al. | | 726/23 |
| 2011/0191420 A1* | 8/2011 | Painter et al. | | 709/204 |
| 2011/0191850 A1* | 8/2011 | Turbin | | 726/24 |
| 2011/0225655 A1 | 9/2011 | Niemelae et al. | | 726/24 |
| 2012/0017275 A1* | 1/2012 | Harmonen | | 726/24 |
| 2012/0066346 A1* | 3/2012 | Virmani et al. | | 709/219 |
| 2012/0192275 A1* | 7/2012 | Oliver et al. | | 726/24 |
| 2012/0222138 A1* | 8/2012 | Aaron | | 726/30 |

* cited by examiner

Primary Examiner — Morshed Mehedi
(74) Attorney, Agent, or Firm — Harrington & Smith

(57) ABSTRACT

Download control is disclosed. An apparatus includes one or more processors, and one or more memories including computer program code. The one or more memories and the computer program code configured to, with the one or more processors, cause the apparatus at least to perform: obtain one or more cryptographic hash values of a target file to be downloaded; cause transmission of the one or more cryptographic hash values to a trusted source; obtain reputation data relating to the target file originated from the trusted source in response to the transmission of the one or more cryptographic hash values; and control download of the target file on the basis of the reputation data.

20 Claims, 8 Drawing Sheets

```
                           1100 TORRENT FILE

{
  'announce': 'http://bttracker.debian.org:6969/announce',
  'info':
  {
     'name': 'debian-503-amd64-CD-1.iso',
     'piece length': 262144,
     'length': 678301696,
     'pieces':
'841ae846bc5b6d7bd6e9aa3dd9e551559c82abc1...d14f1631d776008f83772ee170c42411618190
a4'
  }
}
```

FIG. 11

```
                           1200 MAGNET LINK magnet:?xt=urn:sha1:YNCKHTQCWBTRNJIV4WNAE52SJUQCZO5C
```

FIG. 12

DOWNLOAD CONTROL

FIELD

The invention relates to download control.

BACKGROUND

Download of data over the networks has increased dramatically. Downloaded data may be infested by malicious software (malware) including computer viruses, worms, Trojan horses, spyware, adware, rootkits, and other malicious programs. Download control is crucial in avoiding damage caused by the malware.

BRIEF DESCRIPTION

The present invention seeks to provide improved download control.

According to an aspect of the present invention, there is provided an apparatus comprising one or more processors, and one or more memories including computer program code, the one or more memories and the computer program code configured to, with the one or more processors, cause the apparatus at least to perform: obtain one or more cryptographic hash values of a target file to be downloaded; cause transmission of the one or more cryptographic hash values to a trusted source; obtain reputation data relating to the target file originated from the trusted source in response to the transmission of the one or more cryptographic hash values; and control download of the target file on the basis of the reputation data.

According to another aspect of the present invention, there is provided a method comprising: obtaining one or more cryptographic hash values of a target file to be downloaded; causing transmission of the one or more cryptographic hash values to a trusted source; obtaining reputation data relating to the target file originated from the trusted source in response to the transmission of the one or more cryptographic hash values; and controlling download of the target file on the basis of the reputation data.

According to another aspect of the present invention, there is provided a computer readable medium comprising a set of instructions, which, when executed on an apparatus cause the apparatus to perform: obtaining one or more cryptographic hash values of a target file to be downloaded; causing transmission of the one or more cryptographic hash values to a trusted source; obtaining reputation data relating to the target file originated from the trusted source in response to the transmission of the one or more cryptographic hash values; and controlling download of the target file on the basis of the reputation data.

According to another aspect of the present invention, there is provided an apparatus comprising: means for obtaining one or more cryptographic hash values of a target file to be downloaded; means for causing transmission of the one or more cryptographic hash values to a trusted source; means for obtaining reputation data relating to the target file originated from the trusted source in response to the transmission of the one or more cryptographic hash values; and means for controlling download of the target file on the basis of the reputation data.

LIST OF DRAWINGS

Example embodiments of the present invention are described below, by way of example only, with reference to the accompanying drawings, in which FIGS. 1, 2, 3 and 4 are simplified block diagrams illustrating various example embodiments of an apparatus;

FIG. 11 illustrates an example embodiment of a torrent file; and

FIG. 12 illustrates an example embodiment of a magnet link.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the apparatuses have been depicted as separate single entities, different parts may be implemented in one or more physical or logical entities.

Figure 1:
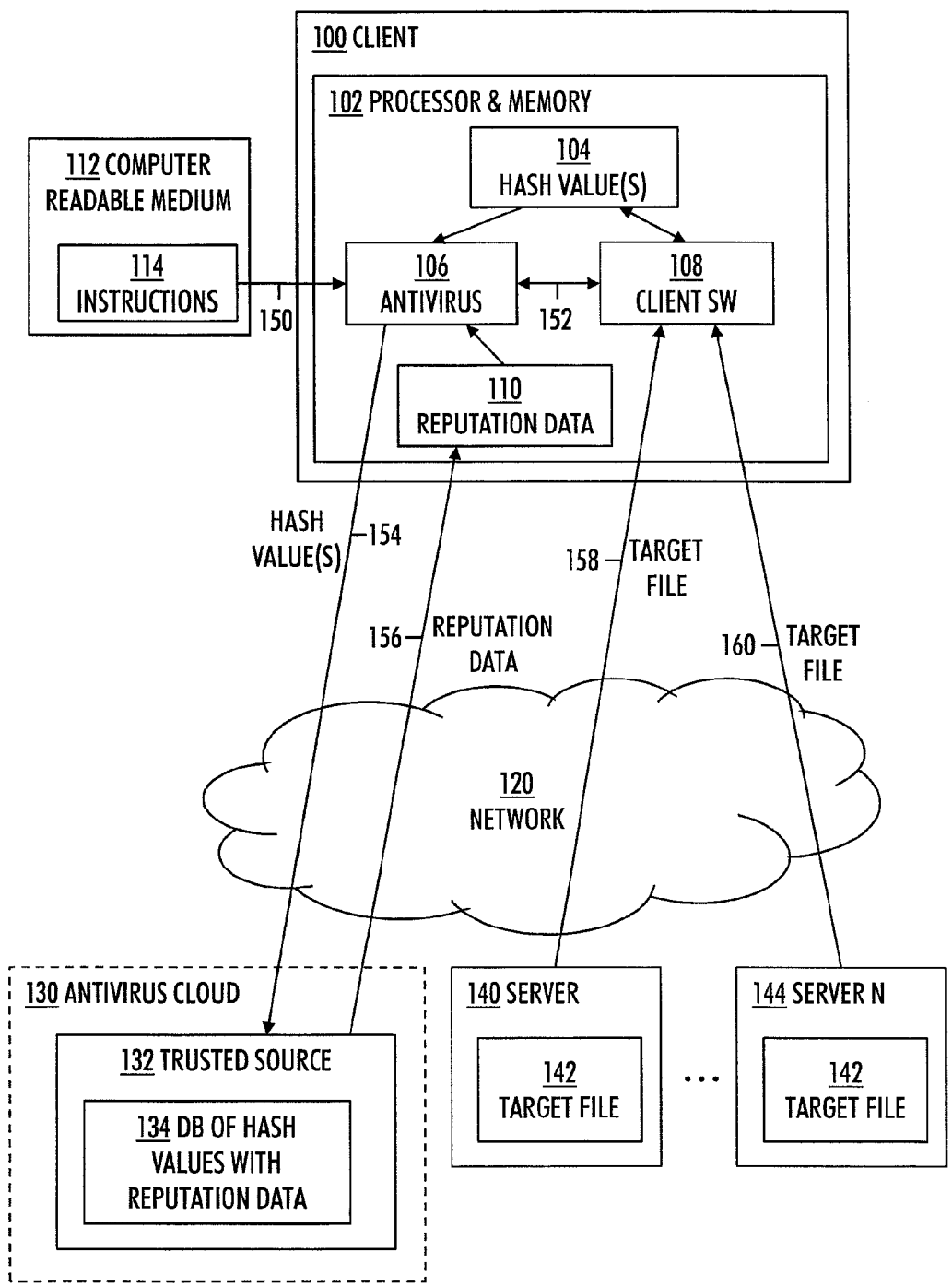

FIG. 1 illustrates an example embodiment of the general operation environment including a client apparatus 100 communicating 154, 156, 158, 160 over a network 120 with a trusted source 132 and a server 140, 144.

The client apparatus 100 may be any electronic apparatus capable of downloading data over the network 120. A non-exhaustive list of the types of the client apparatus 100 includes: an electronic digital computer, a desktop computer, a portable computer, a laptop computer, a tablet computer, a smartphone, a mobile phone, or any other electronic apparatus requiring download control. The client apparatus 100 may employ an operating system such as Android, Microsoft Windows, Microsoft Windows Phone, Apple iOS, Apple Mac OS X, Linux, or Symbian, for example.

The network 120 may include various wired/wireless standard/non-standard/proprietary communication networks such as a computer network, a private network, an IP-based network (TCP/IP=Transmission Control Protocol/Internet Protocol), the Internet, the telephone network including the public switched telephone network, any mobile phone network, regardless of the generation (such as 2G, 3G, 4G, beyond 4G, etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LTE-Advanced), and other radio systems (in their present forms and/or in their evolution forms), such as WLAN (Wireless Local Area Network) based on IEEE (Institute of Electrical and Electronics Engineers) 802.11 standard or its evolution versions (IEEE 802.11ac etc.), WiMAX (Worldwide Interoperability for Microwave Access, or Wi-Fi, for example.

The trusted source 132 refers to a reliable party keeping track of reputation of target files 142. The trusted source 132 may operate in an antivirus cloud 130, which refers to antivirus software operating in a cloud computing environment for prevention, detection, and removal of malware, whereby shared resources, software, and information are provided to the antivirus (software) 106 of the client 100 as a utility over the network 120. Naturally, the antivirus cloud 130 may be implemented according to the more traditional client-server computing model as well. Furthermore, the trusted source 132 may also be implemented as a stand-alone reputation server without any antivirus cloud 130.

The server 140, 144 is a part of the client-server computing model that acts as distributed application which partitions tasks or workloads between the provider of a resource or service, called server 140, 144, and the service requester, called client 100. The server computer 140, 144 is a host that is running one or more server programs which share their resources with clients 100. The client 100 may request a server's content or service function, in our case a target file 142. The client 100 therefore initiates a communication session with the server 140, 144 which awaits incoming requests. The server 140, 144 may also operate according to the cloud computing model. Additionally, or alternatively, the server may also operate according to the peer-to-peer (P2P) computing model. A pure peer-to-peer system consists of equal peer nodes that simultaneously function as both clients 100 and servers 140, 144. In a hybrid peer-to-peer system, a need for a special role is recognized: one or several nodes, but not all nodes, have a special role, which serves the other nodes of the peer-to-peer system. In FIG. 1, the server 140, 144 may have the special role serving the client 100. Additionally, the client 100 may also serve as a server to another client thereby sharing the downloaded target file 142.

The client apparatus 100 comprises one or more processors 102, and one or more memories 102 including computer program code 106, 108. The processor 102 and the memory 102 may be implemented by electronic circuitry.

The term 'processor' refers to a physical device that is capable of processing data in a computer or other digital electronic device. Depending on the processing power needed, the client apparatus 100 may comprise several processors 102 such as parallel processors or one or more multicore processors. A non-exhaustive list of implementation techniques for the processor 102 includes, but is not limited to: logic components, standard integrated circuits, application-specific integrated circuits (ASIC), system-on-a-chip (SoC), application-specific standard products (ASSP), microprocessors, digital signal processors, special-purpose computer chips, and field-programmable gate arrays (FPGA).

The term 'memory' refers to a physical device that is capable of storing the computer program code 106, 108 and data on a temporary or permanent basis for use in a computer or other digital electronic device. In an example embodiment, the term 'memory' refers to working memory (also known as primary storage, main memory or internal storage) directly accessible to the processor. In an example embodiment, the working memory may be implemented as a random-access memory (RAM), such as a dynamic RAM, DRAM.

Figure 4:
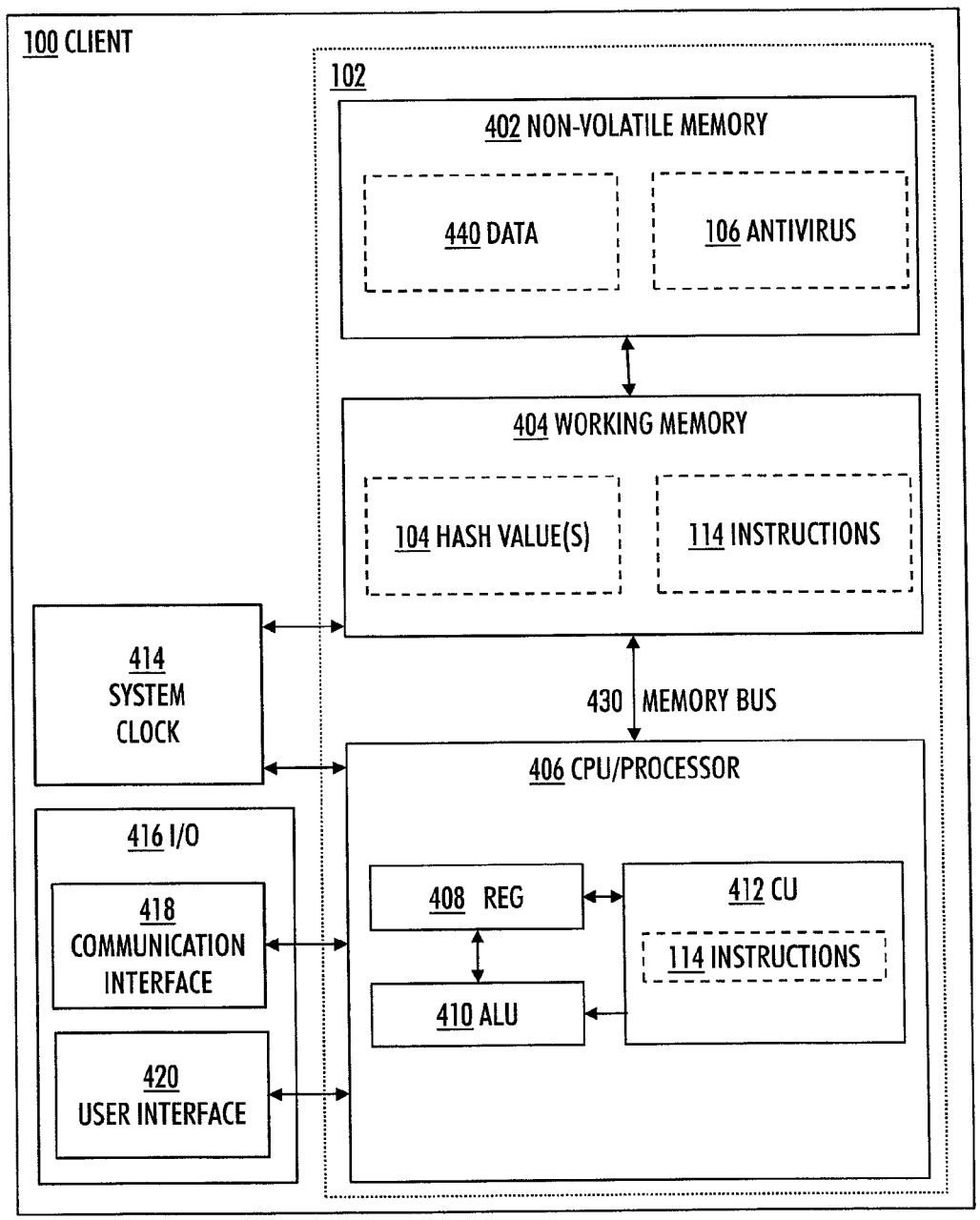

In an example embodiment illustrated in FIG. 4, the client apparatus 100 may be an electronic digital computer, which may comprise a non-volatile memory 402, a working memory 404, a processor 406, a system clock 414 and an input/output 416 including a communication interface 418 and a user interface 420. Naturally, the computer may comprise a number of other peripheral devices, not illustrated here for the sake of clarity.

In an example embodiment, the system clock 414 constantly generates a stream of electrical pulses, which cause the various transferring operations within the computer to take place in an orderly manner and with specific timing.

In an example embodiment, the processor 406 may be implemented as a microprocessor implementing functions of a central processing unit (CPU) on an integrated circuit. The CPU 406 is a logic machine executing a computer program 106, which comprises program instructions 114. The computer program 106 may be coded as a computer program using a programming language, which may be a high-level programming language, such as C, C++, or Java, or a low-level programming language, such as a machine language, or an assembler. There are many ways to structure the program 106. In an example embodiment, the operations of the program may be divided into functional modules, sub-routines, methods, classes, objects, applets, macros, etc., depending on the software design methodology and the programming language used. In modern programming environments, there are software libraries, i.e. compilations of ready-made functions, which may be utilized by the program for performing a wide variety of standard operations.

The CPU 406 may comprise a set of registers 408, an arithmetic logic unit (ALU) 410, and a control unit (CU) 412. The control unit 412 is controlled by a sequence of instructions 114 transferred to the CPU 406 from the working memory 404. The working memory 404 is directly or indirectly connected to the CPU 406 via a memory bus 430 including two buses: an address bus and a data bus. The CPU 406 sends a memory address indicating the desired location of data (=data such as the hash value(s) 104 or instructions 114) number through the address bus, whereupon the CPU 406 reads or writes the data itself from/to the working memory 404 using the data bus.

The control unit 412 may contain a number of microinstructions for basic operations. The implementation of the microinstructions may vary, depending on the CPU design. The microprocessor 406 may also have an operating system (such as general-purpose operating system, a dedicated operating system of an embedded system, or a real-time operating system), which may provide the computer program 106 with system services. During running of the program 106, the instructions 114 are transferred via the memory bus 430 from the working memory 404 into the control unit 412, wherein usually a portion of the instructions 114 resides and controls the operation.

In an example embodiment, the non-volatile memory 402 retains the stored information even when not powered. Examples of non-volatile memory include read-only memory (ROM), flash memory, magnetic computer storage devices such as hard disk drives, and optical discs. As is shown in FIG. 4, the non-volatile memory 402 may store both data 440 and the computer program 106 comprising the instructions 114.

An example embodiment, illustrated in FIG. 1, provides a computer readable medium 112 comprising a set of instructions 114, which, when executed on the client apparatus 100 cause the client apparatus 100 to perform the required operations. In an example embodiment, the instructions 114 may be in source code form, object code form, or in some intermediate form. The computer-readable medium 112 may comprise at least the following: any entity or device capable of carrying 150 the instructions 114 to the client apparatus 100, a record medium, a computer memory, a read-only memory, an electrical carrier signal, a telecommunications signal, and a software distribution medium. In some jurisdictions, depending on the legislation and the patent practice, the medium 112 may not be the telecommunications signal. In an example embodiment, the medium 112 may be a non-transitory computer readable storage medium.

The one or more memories 102 and the computer program code 106, 108 are configured to, with the one or more processors 102, cause the client apparatus 100 at least to perform:
1) obtain one or more cryptographic hash values 104 of the target file 142 to be downloaded;
2) cause transmission 154 of the one or more cryptographic hash values 104 to the trusted source 132;
3) obtain 156 reputation data 110 relating to the target file 142 originated from the trusted source 132 in response to the transmission 154 of the one or more cryptographic hash values 104; and
4) control download 158 of the target file 142 on the basis of the reputation data 110.

In an example embodiment, the cryptographic hash value 104 has been calculated by a cryptographic hash function, which is a deterministic function, whose input is an arbitrary block of data (=contents of the target file 142), and whose output is the hash value 104 (also known as a message digest, digest, digital fingerprint, or checksum). The cryptographic hash value 104 may be a (even globally) unique identifier for the target file 142, similar to the ISBN (International Standard Book Number).

In an example embodiment, the target file 142 to be downloaded refers to any content received locally by the client 100 from the remote server 140. Such content includes, but is not limited to: film, video, music, broadcast, personal material, software etc.

In an example embodiment, the remote server 140 is a web server. In an example embodiment, the remote server 140 utilizes BitTorrent, which is a peer-to-peer file sharing protocol. Rather than downloading a file from a single source server 140, the BitTorrent protocol (bittorrent.org) allows the client 100 to join a "swarm" of hosts 140, 144 enabling simultaneous downloading 158, 160 of the target file 142 that has been divided into small information chunks found on an unlimited number of different hosts 140, 144. In an example embodiment of FIG. 1, there is 1 to N servers 140, 144, N being an integer greater than one.

In an example embodiment, the one or more memories 102 and the computer program code 106, 108 are further configured to, with the one or more processors 102, cause the client apparatus 100 further to perform: obtain the one or more cryptographic hash values 104 of the target file 142 to be downloaded by at least one of the following:
read the one or more cryptographic hash values 104 from a torrent file,
read the one or more cryptographic hash values 104 from a magnet link,
obtain the one or more cryptographic hash values from a web browser 108,
obtain the one or more cryptographic hash values from a peer-to-peer client 108.

As illustrated in FIG. 1, the antivirus 106 and the client software 108 may be separate software entities communicating 152 with each other. The client software 108 may be a web browser, a peer-to-peer client, or any other software application capable of downloading 158, 160 the target file 142. In an example embodiment, the antivirus 106 includes a plug-in that is loaded into the client software 108 for facilitating the communication 152. However, alternatively, the antivirus 106 and the client 108 functionalities may be combined within a single software entity as well. Consequently, the antivirus 106 functionality may be a part of the client software 108.

FIG. 11 illustrates an example embodiment of a de-bencoded torrent file 1100 storing metadata used for BitTorrent. The torrent file 1100 contains the URL (Uniform/Universal Resource Locator) of a tracker, integrity metadata about all the pieces, and possibly additional metadata defined in extensions to the BitTorrent specification. The torrent file 1100 of FIG. 11 includes the following keys:
announce—the URL of the tracker;
info—this maps to a dictionary whose keys are dependent on whether one or more files are being shared:
name—suggested file/directory name where the file(s) is/are to be saved;
piece length—number of bytes per piece. This is commonly 256 KiB, but in our example embodiment pieces are 51 KiB;
pieces—a hash list. That is, a concatenation of each piece's SHA-1 (=a cryptographic hash function designed by the United States National Security Agency) hash 104. As SHA-1 returns a 160-bit hash, pieces is a string whose length is a multiple of 160-bits.

Figure 2:
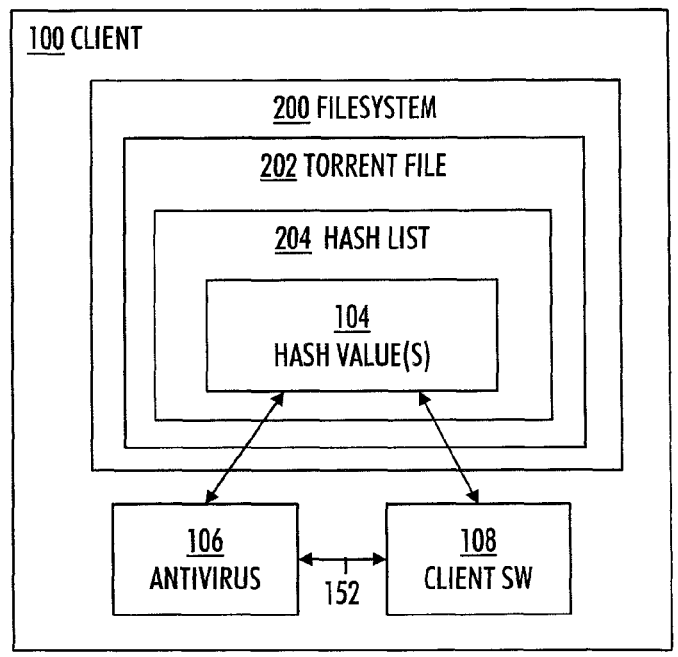

As illustrated in FIG. 2, the antivirus 106 of the client 100 may in collaboration 152 with the client software 106 obtain the hash value(s) 104 from a hash list 204 within a torrent file 202 stored in a filesystem 200 maintaining the physical location of the torrent file 202. In other words, the client 100 may read the hash value(s) from the memory 102, i.e. from a data storage device, such as a hard disk drive, flash memory, solid state-drive (SSD) etc.

Figure 5:
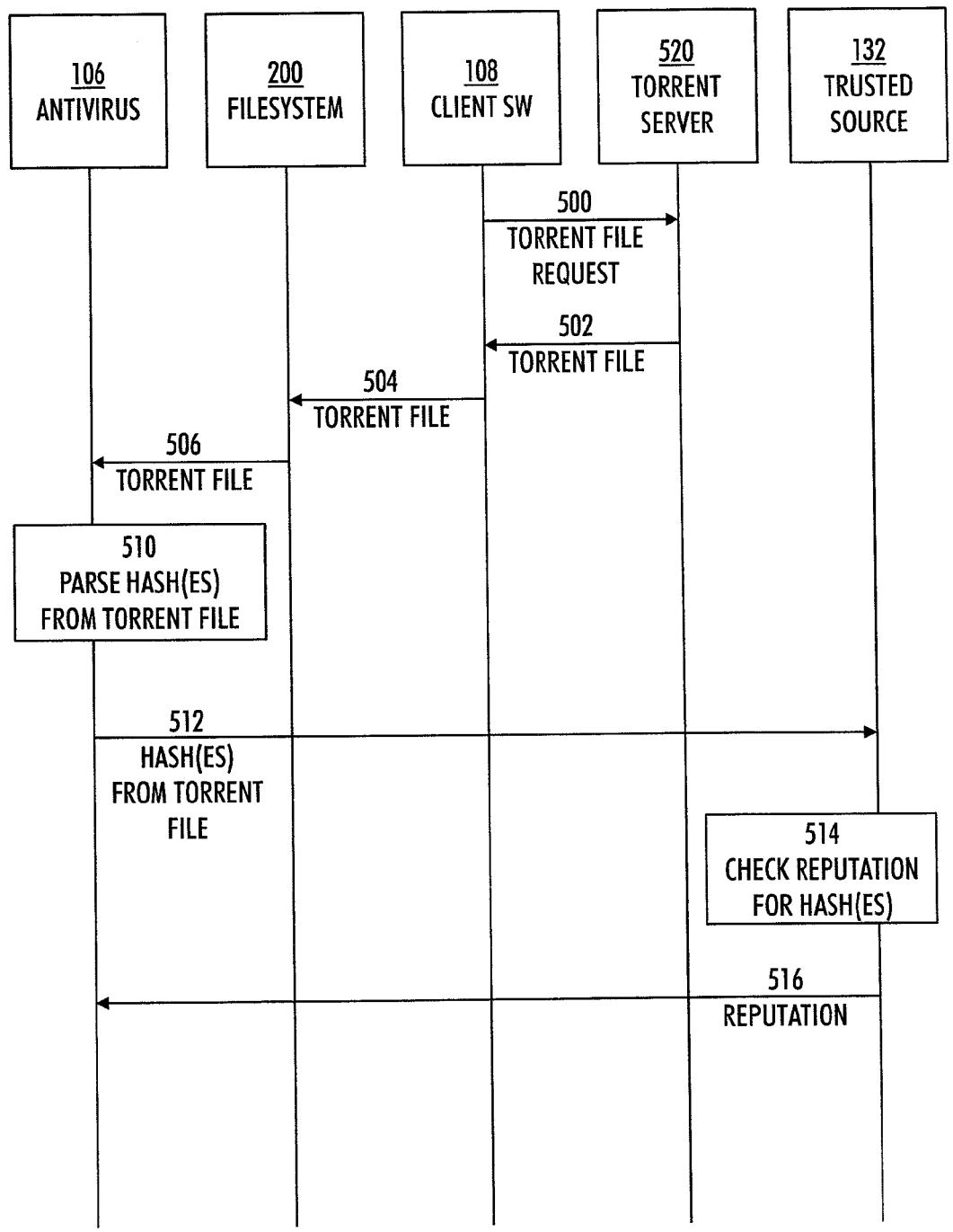
FIGS. 5 and 6 are signal sequence charts illustrating example embodiments of communication.

FIG. 5 illustrates an example embodiment with a signal sequence chart of processing the torrent file 202, 1100. The client software 108 makes 500 a torrent file request for a torrent server 520. The torrent server 520 is the torrent file hosting site, whereas the server 140, 144 hosts the target file 142. The torrent server 520 returns 502 the torrent file for the client software 108. The client software 108 stores 504 the torrent file with the filesystem 200. The antivirus 106 obtains 506 the torrent file from the filesystem 200. The antivirus 106 parses 510 the hash(es) from the torrent file. The antivirus 106 communicates 512 the hash(es) from the torrent file to the trusted source 132. The trusted source 132 checks 514 the reputation for the hash(es). The trusted source 132 returns 516 the reputation for the antivirus 106.

FIG. 12 illustrates an example embodiment of a magnet link 1200. The magnet URI (Uniform Resource Identifier) scheme is a draft open standard defining a URI scheme for magnet links, which are mainly used to reference resources available for download via peer-to-peer networks. Such a link typically identifies a file not by location, but by the content's cryptographic hash value 104. The most common parameter is "xt", meaning "exact topic", which is generally a URN formed from the content hash of the target file 142. In FIG. 12, the string "YNCKHTQCWBTRNJIV4WNAE52SJUQCZO5C" is a Base32 encoded SHA-1 hash 104 of the target file 142.

Figure 3:
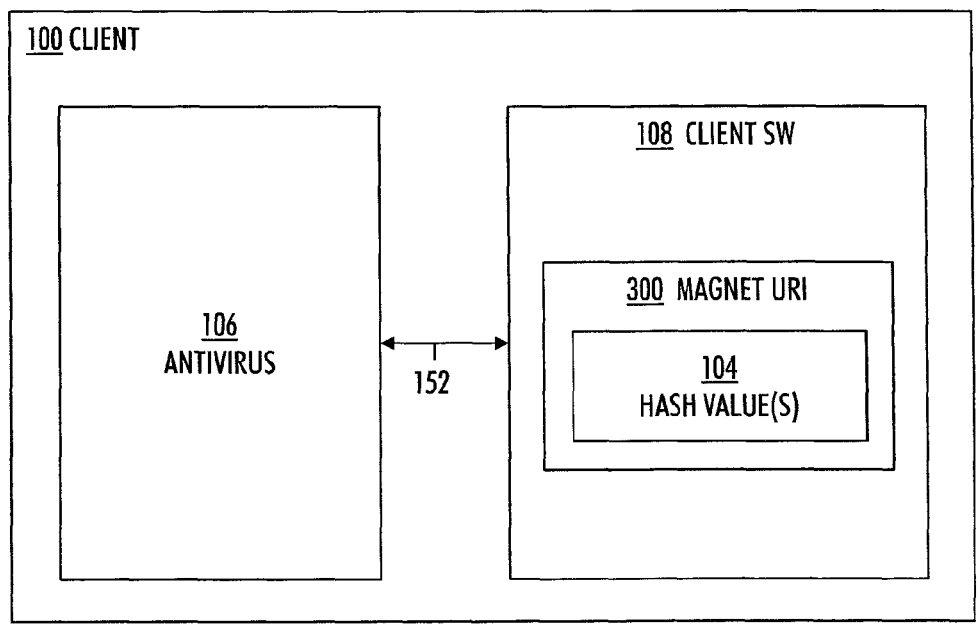

As illustrated in FIG. 3, the client software 108 such as a web browser or a P2P client may obtain the hash value(s) 104 from the magnet URI 300 and communicate 152 the hash values(s) 104 to the antivirus 106. Such communication 152 may require, as was explained earlier, an antivirus plug-in component that is loaded into the client software 108 for catching and communicating all magnet URIs.

Figure 6:
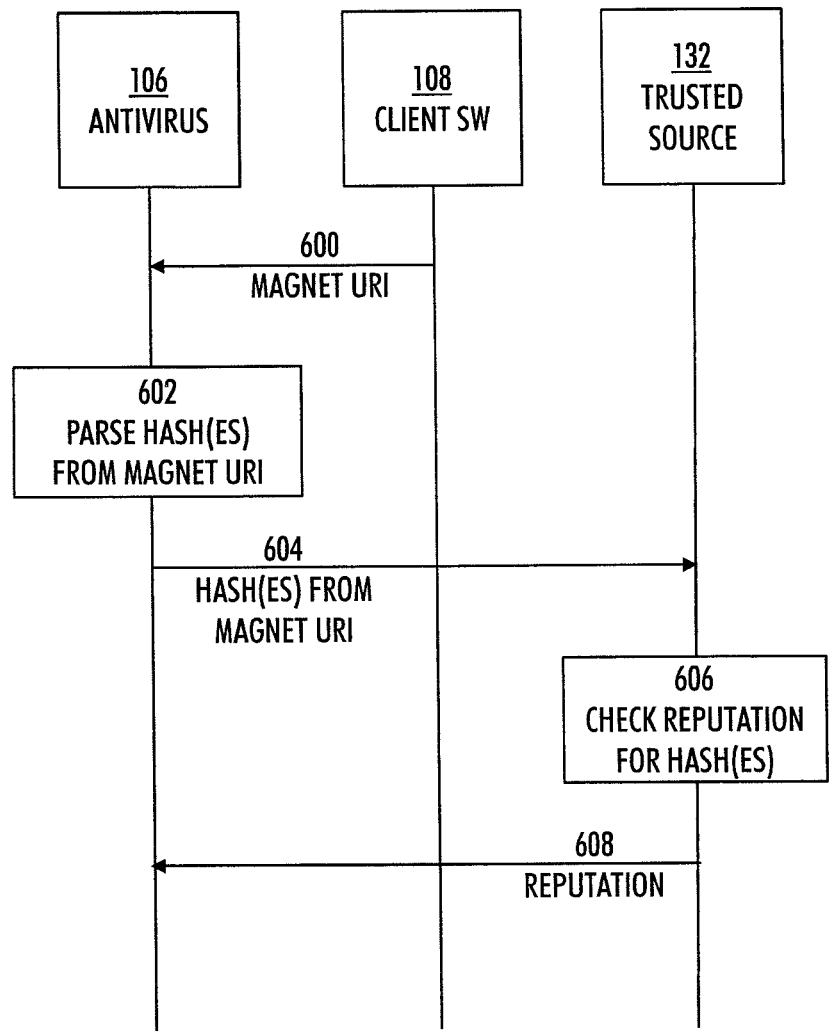
Figure 7:
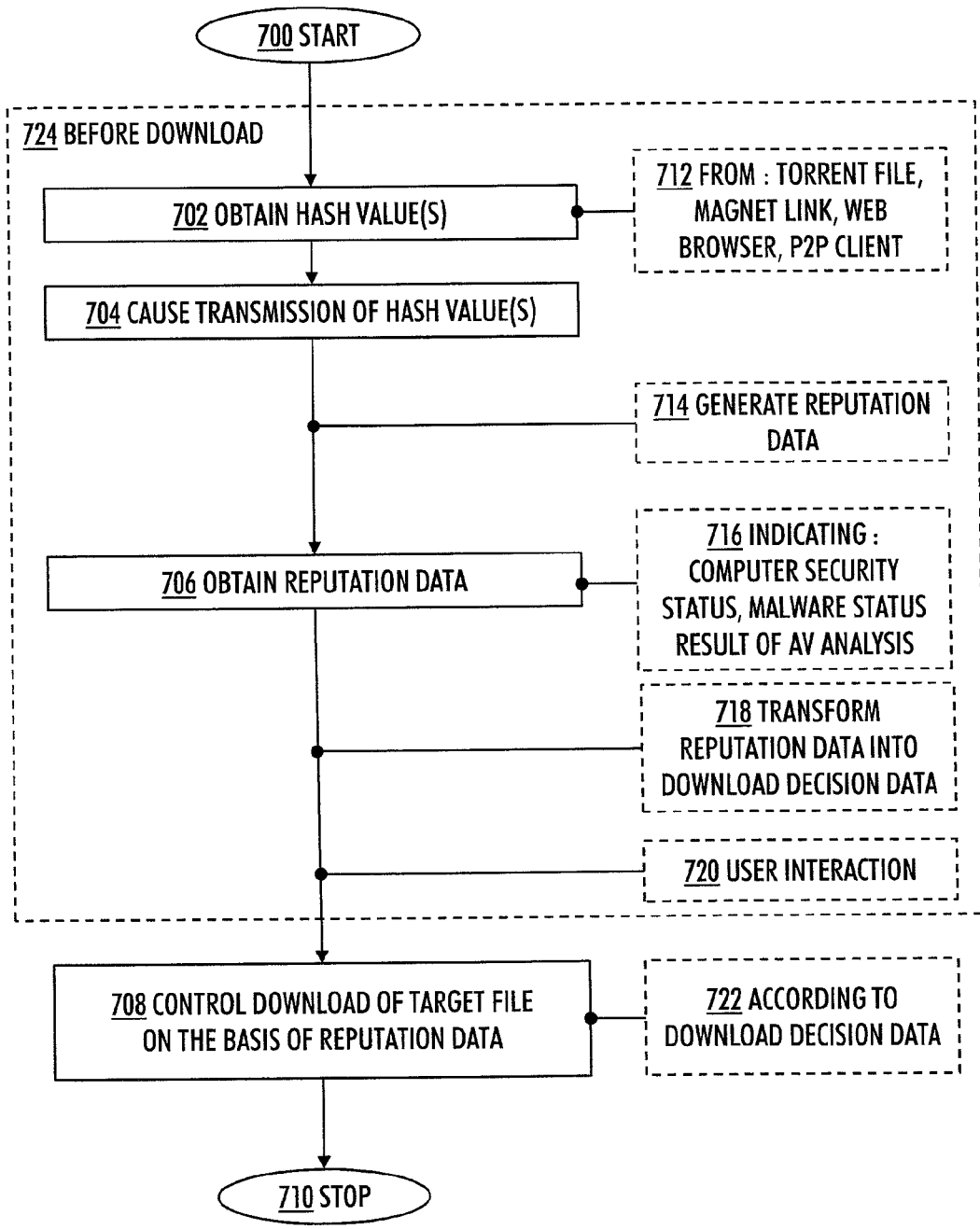
FIGS. 7, 8, 9 and 10 are flow charts illustrating example embodiments of a method.

FIG. 6 illustrates an example embodiment with a signal sequence chart of processing the magnet link 300, 1200. The antivirus 106 receives 600 the magnet URI from the client software 108. The antivirus 106 parses 602 the hash(es) from the magnet URI. The antivirus 106 communicates 604 the hash(es) from the magnet URI to the trusted source 132. The trusted source 132 checks 606 the reputation for the hash(es). The trusted source 132 returns 608 the reputation for the antivirus 106.

In an example embodiment, the reputation data 110 indicates at least one of the following: a computer security status of the target file 142, a malware status of the target file 142, a result of an antivirus software 130 analysis of the target file 142.

In an example embodiment, the reputation data 110 has been generated in the trusted source 132 by checking the one or more cryptographic hash values 154 against a database 134 including reputation data of a plurality of hash values.

In an example embodiment, the one or more memories 102 and the computer program code 106, 108 are further configured to, with the one or more processors 102, cause the client apparatus 100 further to perform: transform the reputation data 110 into a download decision data of the target file 142 to be downloaded; and control the download 158, 160 of the target file 142 on the basis of the reputation data 110 according to the download decision data.

So far it has been described that the reputation data 110 of the target file 142 to be downloaded may be checked. This may save time for the user using the client 100 and valuable bandwidth required for the download 158, 160.

There are two ways to perform the described operation.

In the first example embodiment, the one or more memories 102 and the computer program code 106, 108 are further configured to, with the one or more processors 102, cause the client apparatus 100 to perform the obtaining of the one or more cryptographic hash values 104, the transmission 154 of the one or more cryptographic hash values 104, and the obtaining 156 of the reputation data 110 before starting the download 158, 160 of the target file 142 to be downloaded, whereupon the download 158, 160 of the target file 142 is controlled on the basis of the reputation data 110.

This first example embodiment allows the antivirus 106 to prevent malicious (=target file 142 is contaminated with malware) download 158, 160 from starting, thus preventing the infection of the client 100. As there is no need to download the target file 142 first to perform the malware check, time, storage space and bandwidth are saved. There is also no need to waste computing resources of the client 100 for scanning the target file 142.

In the second example embodiment, the one or more memories 102 and the computer program code 106, 108 are further configured to, with the one or more processors 102, cause the client apparatus 100 further to perform at least one of the following:

control the download 158, 160 of the target file 142 on the basis of the reputation data 110 such that if the reputation data indicates that the target file 142 to be downloaded is clean, download 158, 160 is allowed, or if the reputation data 110 indicates that the target file 142 to be downloaded is malicious, download 158, 160 is not allowed;

if the download 158, 160 of the target file 142 has been initiated before the obtaining 156 of the reputation data 110, control the download 158, 160 of the target file 142 on the basis of the reputation data 110 such that the download 158, 160 is interrupted if the reputation data 110 indicates that the target file 142 is not safe or the download 158, 160 is continued if the reputation data 110 indicates that the target file 142 is safe; or if the download 158, 160 of the target file 142 has been completed before the obtaining 156 of the reputation data 110, control the download 158, 160 of the target file 142 on the basis of the reputation data 110 such that the downloaded target file 142 is discarded if the reputation data 110 indicates that the target file 142 is not safe or the downloaded target file 142 is forwarded for further processing if the reputation data 110 indicates that the target file 142 is safe.

This second example embodiment allows the antivirus 106 not to allow download 158, 160 if the target file 142 is malicious, interrupt malicious (=target file 142 is infested with malware) download 158, 160, or discard the malicious (=target file 142 is infested with malware) download 158, 160, thus preventing the infection of the client 100. Time of the user may be saved as there is no need to first wait for the reputation data 156, but the download 158, 160 may be started immediately.

Next, example embodiments of a method will be described with reference to FIGS. 7, 8, 9 and 10. Other functions, not described in this application, may also be executed between the operations or within the operations. Some of the operations or parts of the operations may also be left out or replaced by a corresponding operation or part of the operation.

The method starts in 700.

In 702, one or more cryptographic hash values of a target file to be downloaded are obtained.

In 704, transmission of the one or more cryptographic hash values to a trusted source is caused.

In 706, reputation data relating to the target file originated from the trusted source in response to the transmission of the one or more cryptographic hash values is obtained. In an example embodiment 716, the reputation data indicates at least one of the following: a computer security status of the target file, a malware status of the target file, a result of an antivirus software analysis of the target file. In an example embodiment 714, the reputation data has been generated in the trusted source by checking the one or more cryptographic hash values against a database including reputation data of a plurality of hash values.

In 708, download of the target file is controlled on the basis of the reputation data.

The method ends in 710.

The embodiments of the earlier described client apparatuses 100 may also be used to enhance the method. In an example embodiment, the method may be implemented in the client apparatus 100 described earlier. In an embodiment, a computer program comprises instructions 114, which, when loaded into the apparatus 100, cause the apparatus 100 to perform the described process and its further example embodiments. In an embodiment, a computer readable storage medium comprises the computer program.

Next, further example embodiments of the method will be described. These example embodiments may be freely combined with each other in order to produce further example embodiments.

In an example embodiment, the obtaining 702 of the one or more cryptographic hash values of the target file to be downloaded comprises at least one of the following 712:

reading the one or more cryptographic hash values from a torrent file;

reading the one or more cryptographic hash values from a magnet link;
obtaining the one or more cryptographic hash values from a web browser;
obtaining the one or more cryptographic hash values from a peer-to-peer client.

In an example embodiment, user interaction 720 relating to the reputation data is performed. The contents of the reputation data, for example, may be communicated to the user, and the user may make the final decision regarding the download.

In an example embodiment, the method further comprises: transforming 718 the reputation data into a download decision data of the target file to be downloaded; and controlling 708, 722 the download of the target file on the basis of the reputation data according to the download decision data.

In an example embodiment 724, the obtaining 702 of the one or more cryptographic hash values, the transmission 704 of the one or more cryptographic hash values, and the obtaining 706 of the reputation data are performed before starting the download of the target file to be downloaded, whereupon the download of the target file is controlled 708 on the basis of the reputation data.

Figure 8:
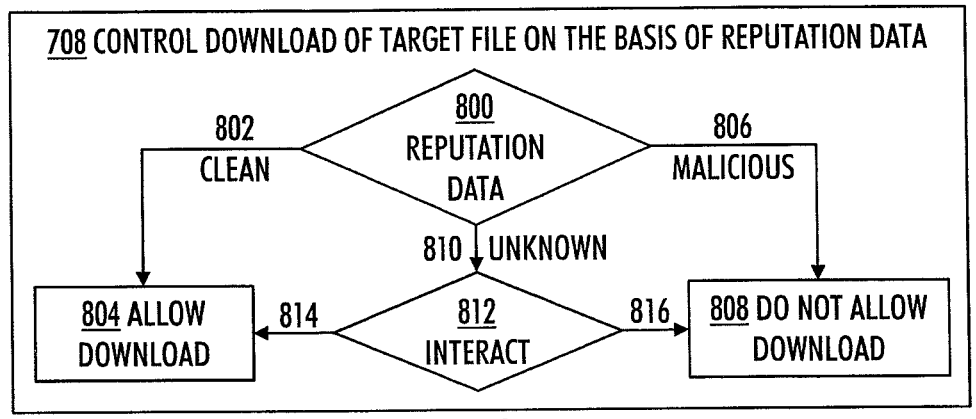

In an example embodiment, illustrated in FIG. 8, the method further comprises: controlling 708 the download of the target file on the basis of the reputation data 800 such that if the reputation data indicates that the target file to be downloaded is clean 802, download is allowed 804, or if the reputation data indicates that the target file to be downloaded is malicious 806, download is not allowed 808. The reputation data 800 may also be unknown 810, i.e. it is not known whether the target file is clean 802 or malicious 806, in which case user interaction 812 may be used to make the selection: the user may select 814 to allow 804 the download, or select 816 not 808 to allow the download.

Figure 9:
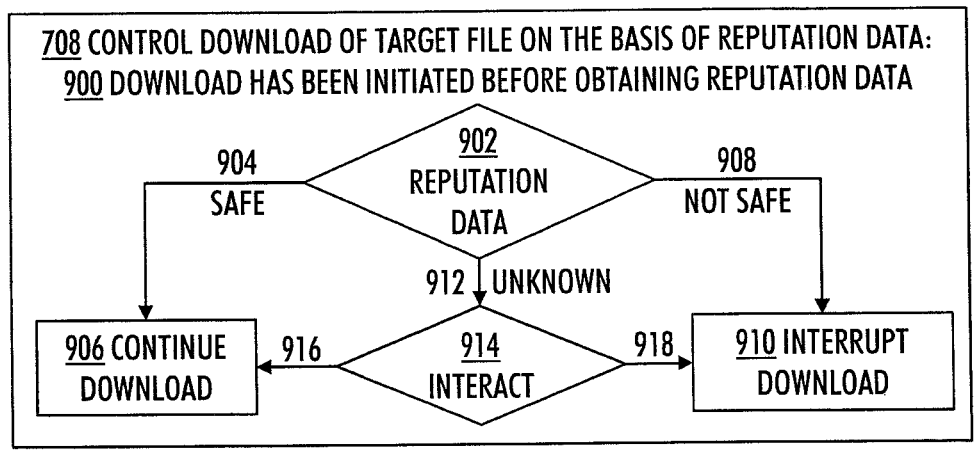

In an example embodiment, illustrated in FIG. 9, the method further comprises: if the download of the target file has been initiated before the obtaining of the reputation data 900, controlling 708 the download of the target file on the basis of the reputation data 902 such that the download is interrupted 910 if the reputation data indicates that the target file is not safe 908 or the download is continued 906 if the reputation data indicates that the target file is safe 904. The reputation data 900 may also be unknown 912, in which case user interaction 914 may be used to make the selection: the user may select 916 to continue 906 the download, or select 918 to interrupt 910 the download.

Figure 10:
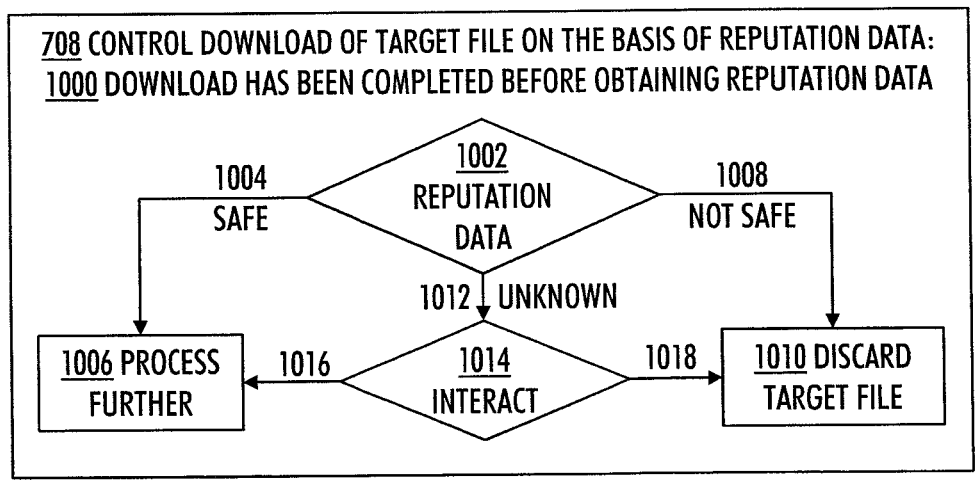

In an example embodiment, illustrated in FIG. 10, the method further comprises: if the download of the target file has been completed before the obtaining of the reputation data 1000, controlling 708 the download of the target file on the basis of the reputation data 1002 such that the downloaded target file is discarded 1010 if the reputation data indicates that the target file is not safe 1008 or the downloaded target file is forwarded for further processing 1006 if the reputation data indicates that the target file is safe 1004. The reputation data 1002 may also be unknown 1012, in which case user interaction 1014 may be used to make the selection: the user may select 1016 to process 1006 further the downloaded target file, or select 1018 to discard 1010 the downloaded target file.

It will be obvious to a person skilled in the art that, as technology advances, the inventive concept can be implemented in various ways. The invention and its embodiments are not limited to the example embodiments described above but may vary within the scope of the claims.

The invention claimed is:

1. An apparatus comprising
one or more processors, and
one or more memories including computer program code, the one or more memories and the computer program code configured to, with the one or more processors, cause the apparatus at least to perform:
obtain one or more cryptographic hash values of a target file to be downloaded;
cause transmission of the one or more cryptographic hash values to a trusted source;
obtain reputation data relating to the target file originated from the trusted source in response to the transmission of the one or more cryptographic hash values; and
control download of the target file on the basis of the reputation data,
wherein the one or more memories and the computer program code are further configured to, with the one or more processors, cause the apparatus further to perform:
obtain the one or more cryptographic hash values of the target file to be downloaded by at least one of the following: read the one or more cryptographic hash values from a torrent file, read the one or more cryptographic hash values from a magnet link.

2. The apparatus of claim 1, wherein the reputation data indicates at least one of the following: a computer security status of the target file, a malware status of the target file, a result of an antivirus software analysis of the target file.

3. The apparatus of claim 1, wherein the reputation data has been generated in the trusted source by checking the one or more cryptographic hash values against a database including reputation data of a plurality of hash values.

4. The apparatus of claim 1, wherein the one or more memories and the computer program code are further configured to, with the one or more processors, cause the apparatus further to perform:
transform the reputation data into a download decision data of the target file to be downloaded; and
control the download of the target file on the basis of the reputation data according to the download decision data.

5. The apparatus of claim 1, wherein the one or more memories and the computer program code are further configured to, with the one or more processors, cause the apparatus to perform the obtaining of the one or more cryptographic hash values, the transmission of the one or more cryptographic hash values, and the obtaining of the reputation data before starting the download of the target file to be downloaded, whereupon the download of the target file is controlled on the basis of the reputation data.

6. The apparatus of claim 1, wherein the one or more memories and the computer program code are further configured to, with the one or more processors, cause the apparatus further to perform at least one of the following:
control the download of the target file on the basis of the reputation data such that if the reputation data indicates that the target file to be downloaded is clean, download is allowed, or if the reputation data indicates that the target file to be downloaded is malicious, download is not allowed;
if the download of the target file has been initiated before the obtaining of the reputation data, control the download of the target file on the basis of the reputation data such that the download is interrupted if the reputation data indicates that the target file is not safe or the download is continued if the reputation data indicates that the target file is safe; or if the download of the target file has been completed before the obtaining of the reputation data, control the download of the target file on the basis of the reputation data such that the downloaded target file is discarded if the reputation data indicates that the target file is not safe or the downloaded target file is forwarded for further processing if the reputation data indicates that the target file is safe.

7. A method comprising:
obtaining one or more cryptographic hash values of a target file to be downloaded;
causing transmission of the one or more cryptographic hash values to a trusted source;
obtaining reputation data relating to the target file originated from the trusted source in response to the transmission of the one or more cryptographic hash values; and
controlling download of the target file on the basis of the reputation data,
wherein the obtaining the one or more cryptographic hash values of the target file to be downloaded comprises at least one of the following:
reading the one or more cryptographic hash values from a torrent file;
reading the one or more cryptographic hash values from a magnet link.

8. The method of claim 7, wherein the reputation data indicates at least one of the following: a computer security status of the target file, a malware status of the target file, a result of an antivirus software analysis of the target file.

9. The method of claim 7, wherein the reputation data has been generated in the trusted source by checking the one or more cryptographic hash values against a database including reputation data of a plurality of hash values.

10. The method of claim 7, further comprising:
transforming the reputation data into a download decision data of the target file to be downloaded; and
controlling the download of the target file on the basis of the reputation data according to the download decision data.

11. The method of claim 7, wherein the obtaining of the one or more cryptographic hash values, the transmission of the one or more cryptographic hash values, and the obtaining of the reputation data are performed before starting the download of the target file to be downloaded, whereupon the download of the target file is controlled on the basis of the reputation data.

12. The method of claim 7, further comprising at least one of the following:
controlling the download of the target file on the basis of the reputation data such that if the reputation data indicates that the target file to be downloaded is clean, download is allowed, or if the reputation data indicates that the target file to be downloaded is malicious, download is not allowed;
if the download of the target file has been initiated before the obtaining of the reputation data, controlling the download of the target file on the basis of the reputation data such that the download is interrupted if the reputation data indicates that the target file is not safe or the download is continued if the reputation data indicates that the target file is safe;
if the download of the target file has been completed before the obtaining of the reputation data, controlling the download of the target file on the basis of the reputation data such that the downloaded target file is discarded if the reputation data indicates that the target file is not safe or the downloaded target file is forwarded for further processing if the reputation data indicates that the target file is safe.

13. A non-transitory computer readable medium comprising a set of instructions, which, when executed on an apparatus cause the apparatus to perform:
obtaining one or more cryptographic hash values of a target file to be downloaded;
causing transmission of the one or more cryptographic hash values to a trusted source;
obtaining reputation data relating to the target file originated from the trusted source in response to the transmission of the one or more cryptographic hash values; and
controlling download of the target file on the basis of the reputation data, the non-transitory computer readable medium, comprising a set of further instructions, which, when executed on the apparatus cause the apparatus to obtain the one or more cryptographic hash values of the target file to be downloaded by at least one of the following:
reading the one or more cryptographic hash values from a torrent file;
reading the one or more cryptographic hash values from a magnet link.

14. The non-transitory computer readable medium of claim 13, wherein the reputation data indicates at least one of the following: a computer security status of the target file, a malware status of the target file, a result of an antivirus software analysis of the target file.

15. The non-transitory computer readable medium of claim 13, wherein the reputation data has been generated in the trusted source by checking the one or more cryptographic hash values against a database including reputation data of a plurality of hash values.

16. The non-transitory computer readable medium of claim 13, comprising a set of further instructions, which, when executed on the apparatus cause the apparatus to further perform:
transforming the reputation data into a download decision data of the target file to be downloaded; and
controlling the download of the target file on the basis of the reputation data according to the download decision data.

17. The non-transitory computer readable medium of claim 13, wherein the obtaining of the one or more cryptographic hash values, the transmission of the one or more cryptographic hash values, and the obtaining of the reputation data are performed before starting the download of the target file to be downloaded, whereupon the download of the target file is controlled on the basis of the reputation data.

18. The non-transitory computer readable medium of claim 13, comprising a set of further instructions, which, when executed on the apparatus cause the apparatus to further perform at least one of the following:
controlling the download of the target file on the basis of the reputation data such that if the reputation data indicates that the target file to be downloaded is clean, download is allowed, or if the reputation data indicates that the target file to be downloaded is malicious, download is not allowed;
if the download of the target file has been initiated before the obtaining of the reputation data, controlling the download of the target file on the basis of the reputation data such that the download is interrupted if the reputation data indicates that the target file is not safe or the download is continued if the reputation data indicates that the target file is safe;

if the download of the target file has been completed before the obtaining of the reputation data, controlling the download of the target file on the basis of the reputation data such that the downloaded target file is discarded if the reputation data indicates that the target file is not safe or the downloaded target file is forwarded for further processing if the reputation data indicates that the target file is safe.

19. An apparatus comprising:

means for obtaining one or more cryptographic hash values of a target file to be downloaded;

means for causing transmission of the one or more cryptographic hash values to a trusted source;

means for obtaining reputation data relating to the target file originated from the trusted source in response to the transmission of the one or more cryptographic hash values; and means for controlling download of the target file on the basis of the reputation data, wherein the means for obtaining are configured to obtain the one or more cryptographic hash values of the target file to be downloaded by at least one of the following: read the one or more cryptographic hash values from a torrent file, read the one or more cryptographic hash values from a magnet link.

20. The apparatus of claim 1, wherein the one or more cryptographic hash values of the target file to be downloaded are obtained from a file that is separate and distinct from the target file to be downloaded, and are not part of the target file.

\* \* \* \* \*